June 17, 1930.  A. L. SCHMIDT  1,765,288
GRASS CUTTING DEVICE
Filed Aug. 16, 1929
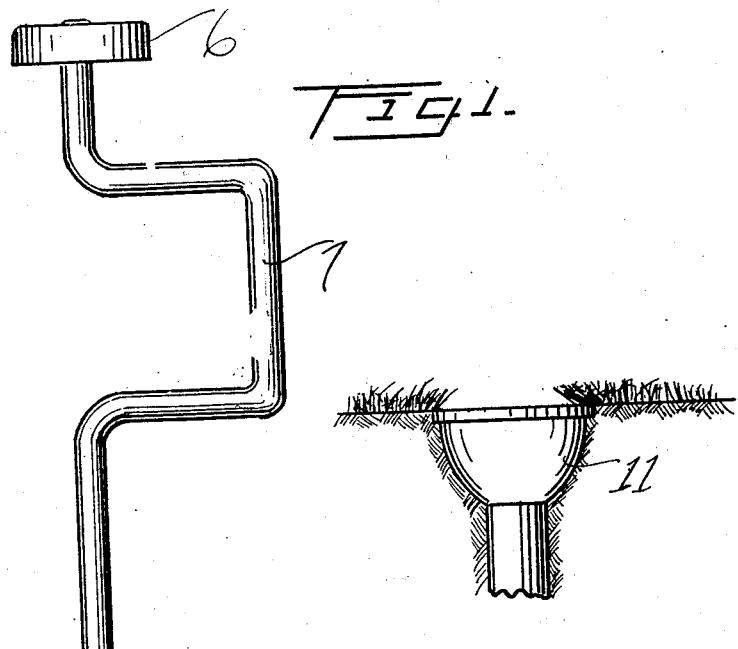
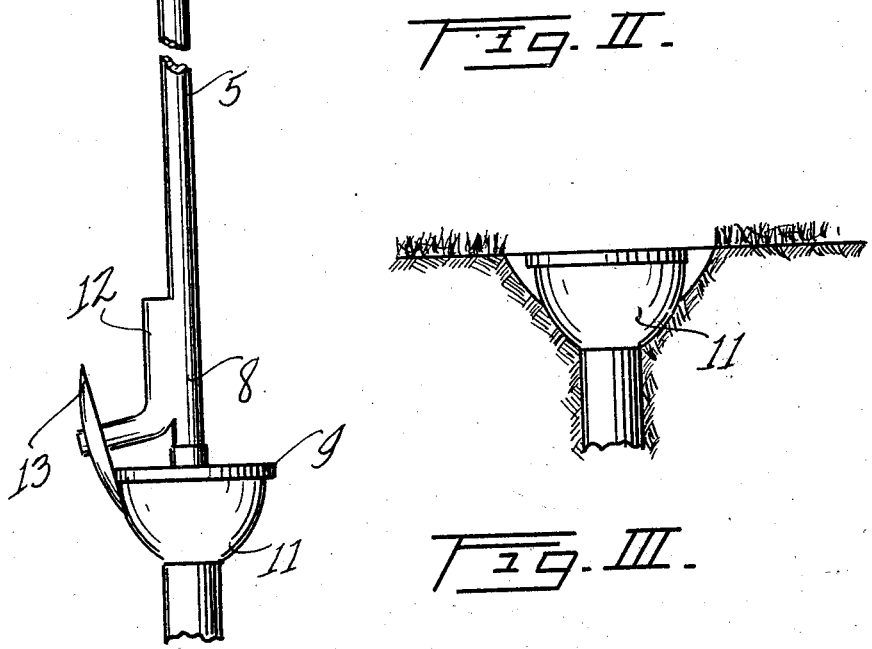
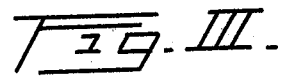
INVENTOR.
ARTHUR L. SCHMIDT
BY *Victor J. Evans*
ATTORNEYS.

Patented June 17, 1930

1,765,288

UNITED STATES PATENT OFFICE

ARTHUR LOUIS SCHMIDT, OF BALDWIN PARK, CALIFORNIA

GRASS-CUTTING DEVICE

Application filed August 16, 1929. Serial No. 386,462.

This invention relates to improvements in grass cutting devices and has particular reference to a device for cutting the grass adjacent a sprinkler head.

The principal object of this invention is to provide means whereby the grass growing adjacent a sprinkler head may be readily clipped therefrom without undue effort upon the part of the used.

A further object of the invention is to provide means for holding the grass overlying the sprinkler head during the clipping operation.

A still further object is to provide means for centering the device with respect to the sprinkler head.

Other objects and advantages will be apparent during the course of the following description.

In the accompanying drawings forming a part of this specification and in which like numerals are employed to designate like parts throughout the same, Figure 1 is a side elevation of my device as the same would appear in use, Figure 2 is a side elevation of a sprinkler head and showing the manner in which the grass will overlie the sprinkler head and interfere with the flow, and Figure 3 is a view similar to Figure 2 showing the manner in which the grass and dirt is positioned away from the sprinkler head.

It is common practice to install in lawns a plurality of sprinkler heads which are connected to a source of water supply with the result that when the water supply is turned on the entire lawn will be sprinkled at one operation. The grass about the sprinkler heads very rapidly grows to the point where it overlies the sprinkler head and consequently interferes with the free flowing of the water. Applicant has therefore devised a tool which may be positioned on the top of the sprinkler head, which tool will hold the grass overlying the sprinkler head and has provided on this tool a cutting implement which not only cuts the held grass but further pushes the dirt or refuse away from the sprinkler head.

In the accompanying drawings wherein for the purpose of illustration is shown a preferred embodiment of my invention, the numeral 5 designates a rod having a head 6 and an offset portion 7. This construction is in reality an elongated brace, the lower extremity 8 being rotatably attached to a cap 9, which cap is adapted to fit over the sprinkler head 11. An offset 12 carries a rotating cutter disc 13, which cutter disc is angularly disposed as best illustrated in Figure 1.

The result of this construction is that when the grass as shown in Figure 2 is overlying the sprinkler head 11, the placing of the cap 9 over the sprinkler head will cause this grass to be engaged by the sprinkler head and the cap. The cap 9 is preferably provided with a flange so as to engage the sides of the sprinkler head.

By now rotating the brace, it will be apparent that the rotary disc 13 will clip all of the grass held by the cap 9 and the sprinkler head 11, at the same time the outer convex surface of the disc will push the dirt or refuse adjacent in the sprinkler head away therefrom as illustrated in Figure 3.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a brace, a cap carried by said brace, and rotatable with respect thereto, and a cutting implement rotatably positioned on said brace for the purpose specified.

2. In a device of the character described, a brace, a rotatable cap carried on said brace, an offset formed on said brace and in close proximity to said cap, a disc rotatably positioned on said offset whereby said disc will rotate about said cap for the purpose specified.

3. In a device of the character described, a brace, a cap, an offset formed on said brace, a disc rotatably positioned on said offset, said disc having one side thereof convexed for the purpose specified.

In testimony whereof I affix my signature.

ARTHUR LOUIS SCHMIDT.